(12) United States Patent
Dettinger et al.

(10) Patent No.: US 7,752,197 B2
(45) Date of Patent: Jul. 6, 2010

(54) SQL QUERY CONSTRUCTION USING DURABLE QUERY COMPONENTS

(75) Inventors: Richard D. Dettinger, Rochester, MN (US); Richard J. Stevens, Mantorville, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 10/264,188

(22) Filed: Oct. 3, 2002

(65) Prior Publication Data

US 2004/0068489 A1 Apr. 8, 2004

(51) Int. Cl.
G06F 17/30 (2006.01)

(52) U.S. Cl. ...................... 707/721; 707/722

(58) Field of Classification Search ............... 707/1–10, 707/100–102, 200, 201
See application file for complete search history.

(56) References Cited

U.S. PATENT DOCUMENTS

| | | | | |
|---|---|---|---|---|
| 5,201,046 A | * | 4/1993 | Goldberg et al. ............ | 707/100 |
| 5,608,904 A | * | 3/1997 | Chaudhuri et al. ............ | 707/2 |
| 6,012,067 A | * | 1/2000 | Sarkar ..................... | 707/103 R |
| 6,272,488 B1 | | 8/2001 | Chang et al. | |
| 6,289,344 B1 | * | 9/2001 | Braia et al. .................... | 707/9 |
| 6,594,669 B2 | * | 7/2003 | Asami et al. ................ | 707/101 |
| 6,725,227 B1 | | 4/2004 | Li | |
| 6,799,184 B2 | * | 9/2004 | Bhatt et al. ................. | 707/102 |
| 7,448,022 B1 | * | 11/2008 | Ram et al. ................... | 717/120 |

* cited by examiner

*Primary Examiner*—Mohammad Ali
*Assistant Examiner*—Marc R Filipczyk
(74) *Attorney, Agent, or Firm*—Patterson & Sheridan

(57) ABSTRACT

The present invention generally is directed to a system, method and article of manufacture for generating a reusable query component. The reusable query component may include one or more query conditions and may be used to facilitate building a database query including the one or more query conditions. Reusable query components may also include reusable query subcomponents, each including one or more query conditions. The query subcomponents may be statically or dynamically linked to the reusable query component.

9 Claims, 11 Drawing Sheets

500

SEARCH MAIN
USER : RESEARCHER 1
SEARCH : 40 YEAR OLDS WITH HEART CONDITIONS

502 — SEARCH CONDITIONS

| ACTION | NOT | CONDITION | COMPONENT |
|---|---|---|---|
| DELETE | ☐ | (AGE > 40) | |
| DELETE  AND | ☐ | (AGE < 50) | |

[ADD CONDITION] —504   [ADD COMPONENT] —506     510

OUTPUT

[CHANGE DATA] —512   [CHANGE FORMAT] —514

SEARCH

[RUN] —516   [SAVE] —518   [SAVE AS COMPONENT] —520

[SHOW SQL] —522   [CANCEL] —524

ADD SEARCH CONDITION
USER : RESEARCHER 1
530 — SEARCH : UNSAVED

CHOOSE ONE CONDITION CATEGORY AND VALUE AND CLICK NEXT. IF YOU KNOW THE ICD-9 OR DRG VALUE TO USE, TYPE IT IN AND CLICK NEXT TO CREATE THE CONDITION.

- ⦿ DEMOGRAPHIC          [AGE ▼] —532
- ○ LABORATORY RESULTS   [DERIVED RESULTS ▼] —534
- ○ REPORTS              [CARDIOLOGY ▼] —536
- ○ DIAGNOSTIC USING ICD-9   VALUE: [    ] [BROWSE] —538

[NEXT] —540   [CANCEL] —542

*FIG. 5B*

```
                                                    500
                                                   /
  ┌──────────────────────────────────────────────────┐
  │                   SEARCH MAIN                    │
  │  USER : RESEARCHER 1                             │
  │  SEARCH : 40 YEAR OLDS WITH HEART CONDITIONS     │
502│──────────────────────────────────────────────────│
  │ SEARCH CONDITIONS                                │
  │   [ACTION]   [NOT]    [CONDITION]   [COMPONENT]  │
  │   DELETE      ☐       (ICD9 = 410)               │
  │   DELETE  OR  ☐       (ICD9 = 412)               │
  │                                                  │
  │   [ADD CONDITION]—504   [ADD COMPONENT]—506      │
  │──────────────────────────────────────────────────│
  │ OUTPUT                                           │
  │   [CHANGE DATA]—512    [CHANGE FORMAT]—514       │
  │──────────────────────────────────────────────────│
  │ SEARCH                                           │
  │   [RUN]—516  [SAVE]—518  [SAVE AS COMPONENT]—520 │
  │   [SHOW SQL]—522         [CANCEL]—524            │
  └──────────────────────────────────────────────────┘
```

*FIG. 5C*

```
                                                    550
                                                   /
  ┌──────────────────────────────────────────────────┐
  │                  SAVE COMPONENT                  │
  │  USER : RESEARCHER 1                             │
  │  SEARCH : UNSAVED                                │
  │──────────────────────────────────────────────────│
  │                                                  │
  │  NAME:        [HEART CONDITIONS]—552             │
  │  DESCRIPTION: [DIAGNOSTIC CODES FOR]—554         │
  │               [HEART CONDITIONS   ]              │
  │                                                  │
  │       ☐ MAKE PUBLIC —556                         │
  │   [OK]—540    [CANCEL]—542                       │
  └──────────────────────────────────────────────────┘
```

*FIG. 5D*

ALL COMPONENTS
USER : RESEARCHER 1
SEARCH : UNSAVED

| NAME | DESCRIPTION | ACTION | ACCESS |
|---|---|---|---|
| HEART CONDITIONS | DIAGNOSTIC CODES FOR HEART CONDITIONS | ADD COPY DELETE EDIT | PUBLIC |
| CNS DISEASES | DIAGNOSTIC CODES FOR CENTRAL NERVOUS SYSTEM CONDITIONS | ADD COPY DELETE EDIT | PRIVATE |

[OK]  [CANCEL]

*FIG. 5E*

SEARCH MAIN
USER : RESEARCHER 1
SEARCH : 40 YEAR OLDS WITH HEART CONDITIONS

SEARCH CONDITIONS

| ACTION | NOT | CONDITION | COMPONENT |
|---|---|---|---|
| DELETE | ☐ | (AGE > 40) | |
| DELETE  AND | ☐ | (AGE < 50) | |
| DELETE  AND | ☐ | ((ICD9=410) OR (ICD9=412)) | HEART CONDITIONS |

[ADD CONDITION] —504     [ADD COMPONENT] —506

OUTPUT

[CHANGE DATA] —512     [CHANGE FORMAT] —514

SEARCH

[RUN] —516  [SAVE] —518     [SAVE AS COMPONENT] —520

[SHOW SQL] —522     [CANCEL] —524

*FIG. 5F*

SQL QUERY CONSTRUCTION USING DURABLE QUERY COMPONENTS

BACKGROUND OF THE INVENTION

1. Field of the Invention

The present invention generally relates to data processing and more particularly to saving query conditions as reusable query components.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Queries are constructed of query conditions that serve to filter results returned from the query. Accordingly, a query may be thought of as group of filters put together to sift out only the data in which they are interested. Often, multiple queries are constructed using common query conditions. For example, in a medical database environment, multiple queries may include query conditions based on age and diagnoses to filter out a set of patients within a certain age range with a certain disease or set of diseases. It may be desirable to reuse common query conditions, rather than reconstruct database queries from scratch.

A conventional approach to reuse common query conditions is to save queries including the common query conditions as scripts. A script generally refers to a file containing a query that can be run to execute the query against a database. Scripts may be copied and edited to include and/or modify query statements, as necessary. In other words, a user wanting to generate a new query may search for a script having desired query conditions, and edit the script rather than creating the new query from scratch.

However, one problem associated with this approach is that properly editing the script to generate the new query may require expertise in a query language and the database being queried. In other words, even editing a script may be beyond the scope of an end user of the data (e.g., a researcher), and may be limited to programmers. Another problem associated with this approach is that it may be difficult to organize scripts in a useful manner that allows the user to identify query conditions contained in the scripts. For example, scripts may be saved with somewhat cryptic file names that fail to identify query conditions in the script. Therefore, even a programmer may waste time searching through scripts analyzing the actual query conditions to find a script with the desired query conditions.

Therefore, there is a need for an improved method for saving and reusing query conditions.

SUMMARY OF THE INVENTION

The present invention generally is directed to a method, system and article of manufacture for generating and storing reusable database query components.

One embodiment provides a method for generating a reusable database query component. The method includes specifying, via a graphical user interface (GUI), one or more query conditions to include in the reusable query component, and specifying, via the GUI, a name to identify the reusable query component.

Another embodiment provides another method for generating a reusable query component for use in building a database query. The method includes specifying at least one query subcomponent to include in the reusable query component, wherein a first one or more query conditions are associated with the query subcomponent and specifying a name to identify the reusable query component. The reusable query component may be dynamically linked to the query subcomponent so that changes in the first one or more conditions associated with the subcomponent may be reflected in queries built using the reusable query component. Alternatively, the first one or more conditions associated with the query subcomponent may be directly added to the reusable query component at a time of creation.

Still another embodiment provides a method of providing access to data having a particular physical data representation. The method includes providing a graphical user interface (GUI) for specifying one or more reusable query components for use in building an abstract query, wherein one or more query conditions defined by one or more logical fields are associated with each reusable query component and providing mapping rules for mapping the one or more logical fields to physical entities of the data.

Yet another embodiment provides a computer-readable medium containing a program which, when executed by a processor, performs operations including receiving, from a user, one or more query conditions to associate with a reusable query component, receiving, from the user, a name for the reusable query component, and storing the one or more query conditions with the name for later reuse.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5A-5F are graphical user interface (GUI) screens for building a database query.

DETAILED DESCRIPTION OF THE PREFERRED EMBODIMENTS

The present invention generally is directed to a system, method and article of manufacture for accessing data independent of the particular manner in which the data is physically represented. In one embodiment, a data repository abstraction layer provides a logical view of the underlying data repository that is independent of the particular manner of data representation. A query abstraction layer is also provided and is based on the data repository abstraction layer. A runtime component performs translation of an abstract query into a form that can be used against a particular physical data representation.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Figure 1:
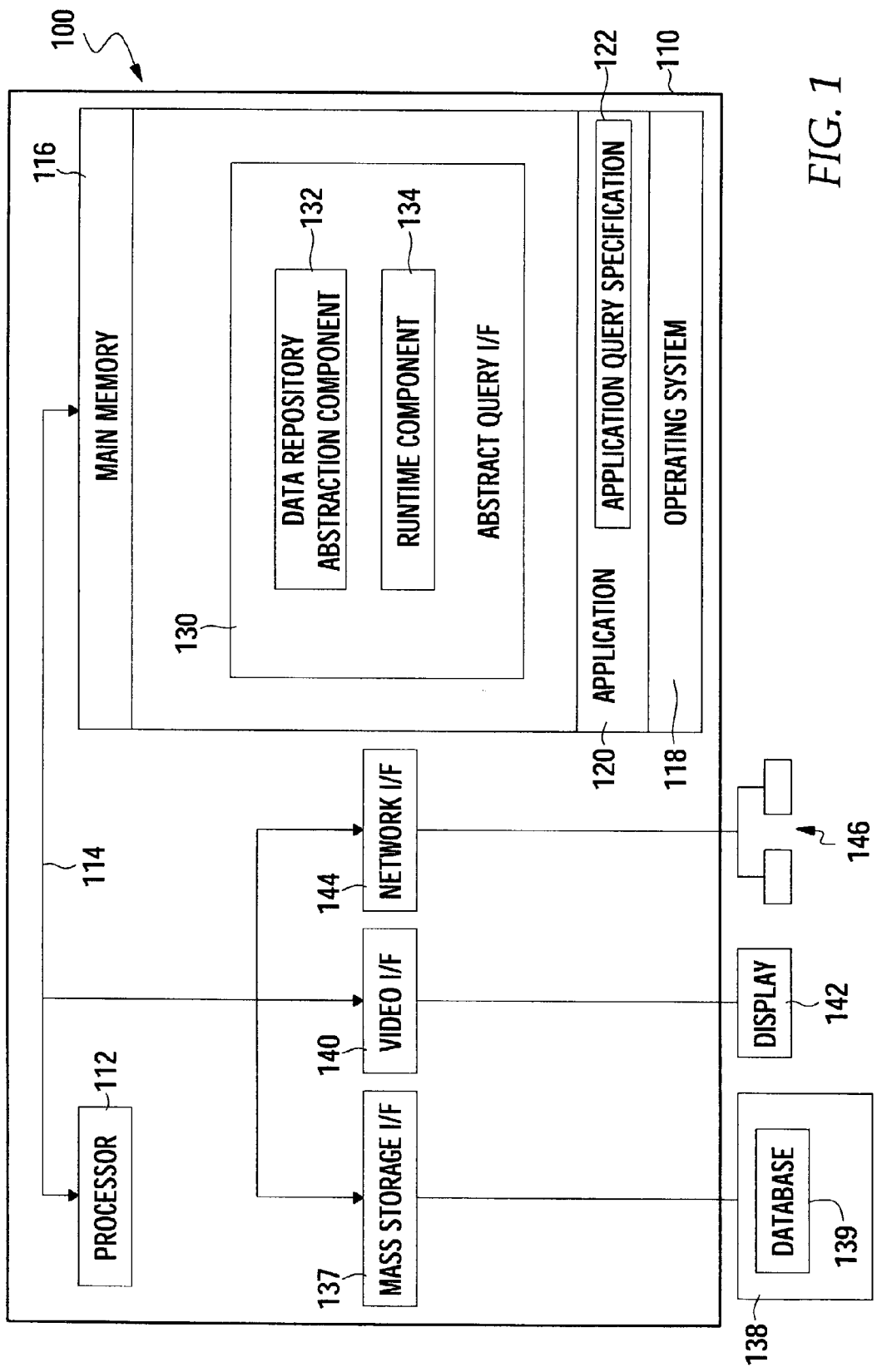
FIG. 1 is a computer system illustratively utilized in accordance with the invention.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 100 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 137 operably connected to a direct access storage device 138, by a video interface 140 operably connected to a display 142, and by a network interface 144 operably connected to the plurality of networked devices 146. The display 142 may be any video output device for outputting viewable information.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., direct access storage device 138) or on another computer coupled to the computer system 110 via bus 114.

The memory 116 is shown configured with an operating system 118. The operating system 118 is the software used for managing the operation of the computer system 100. Examples of the operating system 118 include IBM OS/400®, UNIX, Microsoft Windows®, and the like.

The memory 116 further includes one or more applications 120 and an abstract query interface 130. The applications 120 and the abstract query interface 130 are software products comprising a plurality of instructions that are resident at various times in various memory and storage devices in the computer system 100. When read and executed by one or more processors 112 in the computer system 100, the applications 120 and the abstract query interface 130 cause the computer system 100 to perform the steps necessary to execute steps or elements embodying the various aspects of the invention. The applications 120 (and more generally, any requesting entity, including the operating system 118) are configured to issue queries against a database 139 (shown in storage 138). The database 139 is representative of any collection of data regardless of the particular physical representation. By way of illustration, the database 139 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

The queries issued by the applications 120 are defined according to an application query specification 122 included with each application 120. The queries issued by the applications 120 may be predefined (i.e., hard coded as part of the applications 120) or may be generated in response to input (e.g., user input). In either case, the queries (referred to herein as "abstract queries") are composed using logical fields defined by the abstract query interface 130. In particular, the logical fields used in the abstract queries are defined by a data repository abstraction component 132 of the abstract query interface 130. The abstract queries are executed by a runtime component 134 which transforms the abstract queries into a form consistent with the physical representation of the data contained in the database 139. The application query specification 122 and the abstract query interface 130 are further described with reference to FIG. 2.

Figure 2A:
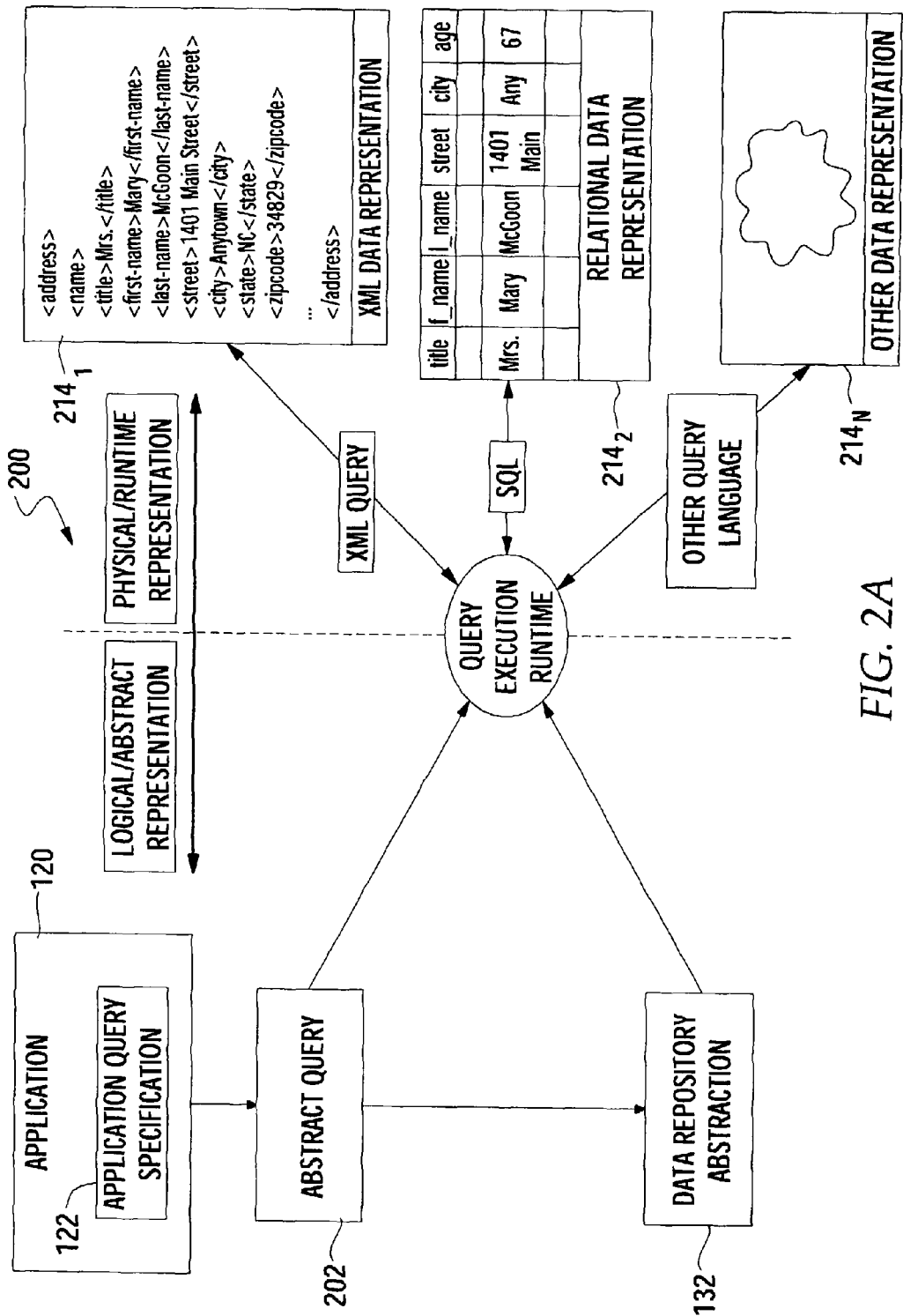
FIG. 2 is a relational view of software components of one embodiment of the invention.
Figure 2B:
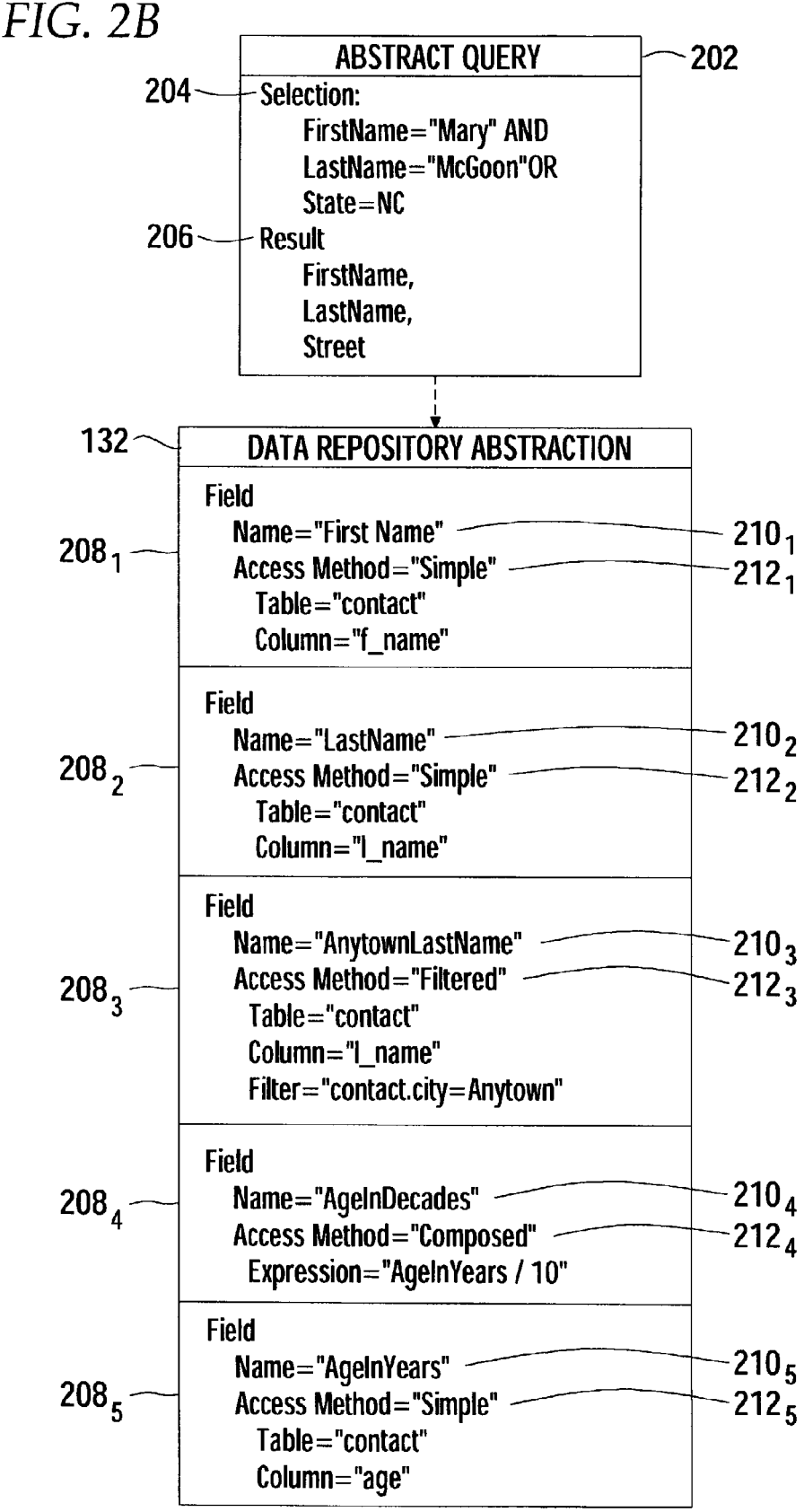

FIGS. 2A-B show an illustrative relational view 200 of components of the invention. The requesting entity (e.g., one of the applications 120) issues a query 202 as defined by the respective application query specification 122 of the requesting entity. The resulting query 202 is generally referred to herein as an "abstract query" because the query is composed according to abstract (i.e., logical) fields rather than by direct reference to the underlying physical data entities in the database 139. As a result, abstract queries may be defined that are independent of the particular underlying data representation used. In one embodiment, the application query specification 122 may include both criteria used for data selection (selection criteria 204) and an explicit specification of the fields to be returned (return data specification 206) based on the selection criteria 204.

The logical fields specified by the application query specification 122 and used to compose the abstract query 202 are defined by the data repository abstraction component 132. In general, the data repository abstraction component 132 exposes information as a set of logical fields that may be used within a query (e.g., the abstract query 202) issued by the application 120 to specify criteria for data selection and specify the form of result data returned from a query operation. The logical fields are defined independently of the underlying data representation being used in the database 139, thereby allowing queries to be formed that are loosely coupled to the underlying data representation.

In general, the data repository abstraction component 132 comprises a plurality of field specifications $208_1$, $208_2$, $208_3$, $208_4$ and $208_5$ (five shown by way of example), collectively referred to as the field specifications 208. Specifically, a field specification is provided for each logical field available for composition of an abstract query. Each field specification comprises a logical field name $210_1$, $210_2$, $210_3$, $210_4$, $210_5$ (collectively, field name 210) and an associated access method $212_1$, $212_2$, $212_3$, $212_4$, $212_5$ (collectively, access method 212). The access methods associate (i.e., map) the logical field names to a particular physical data representation $214_1$, $214_2$ ... $214_N$ in a database (e.g., database 139). By way of illustration, two data representations are shown, an XML data representation $214_1$ and a relational data representation $214_2$. However, the physical data representation $214_N$ indicates that any other data representation, known or unknown, is contemplated. In one embodiment, a single data repository abstraction component 132 contains field specifications (with associated access methods) for two or more physical data representations 214. In an alternative embodiment, a different single data repository abstraction component 132 is provided for each separate physical data representation 214.

Any number of access methods are contemplated depending upon the number of different types of logical fields to be supported. In one embodiment, access methods for simple fields, filtered fields and composed fields are provided. The field specifications $208_1$, $208_2$ and $208_5$ exemplify simple field access methods $212_1$, $212_2$, and $212_5$, respectively. Simple fields are mapped directly to a particular entity in the underlying physical data representation (e.g., a field mapped to a given database table and column). By way of illustration, the simple field access method $212_1$ shown in FIG. 2B maps the logical field name $210_1$ ("FirstName") to a column named "f_name" in a table named "contact". The field specification $208_3$ exemplifies a filtered field access method $212_3$. Filtered fields identify an associated physical entity and provide rules used to define a particular subset of items within the physical data representation. An example is provided in FIG. 2B in which the filtered field access method $212_3$ maps the logical field name $210_3$ ("AnytownLastName") to a physical entity in a column named "l_name" in a table named "contact" and defines a filter for individuals in the city of Anytown. Another example of a filtered field is a New York ZIP code field that maps to the physical representation of ZIP codes and restricts the data only to those ZIP codes defined for the state of New York. The field specification $208_4$ exemplifies a composed field access method $212_4$. Composed access methods compute a logical field from one or more physical fields using an expression supplied as part of the access method definition. In this way, information which does not exist in the underlying data representation may be computed. In the example illustrated in FIG. 2B the composed field access method $212_3$ maps the logical field name $210_3$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 208 include a type attribute which reflects the format of the underlying data. However, in another embodiment, the data format of the field specifications 208 is different from the associated underlying physical data, in which case an access method is responsible for returning data in the proper format assumed by the requesting entity. Thus, the access method must know what format of data is assumed (i.e., according to the logical field) as well as the actual format of the underlying physical data. The access method can then convert the underlying physical data into the format of the logical field.

By way of example, the field specifications 208 of the data repository abstraction component 132 shown in FIG. 2 are representative of logical fields mapped to data represented in the relational data representation $214_2$. However, other instances of the data repository abstraction component 132 map logical fields to other physical data representations, such as XML.

An illustrative abstract query corresponding to the abstract query 202 shown in FIG. 2 is shown in Table I below. By way of illustration, the abstract query 202 is defined using XML. However, any other language may be used to advantage.

TABLE I

QUERY EXAMPLE

```
001  <?xml version="1.0"?>
002  <!--Query string representation: (FirstName = "Mary" AND
     LastName =
003  "McGoon") OR State = "NC"-->
004  <QueryAbstraction>
005    <Selection>
006      <Condition internalID="4">
007        <Condition field="FirstName" operator="EQ" value="Mary"
008  internalID="1"/>
009        Condition field="LastName" operator="EQ" value="McGoon"
010  internalID="3" relOperator="AND"></Condition>
011      </Condition>
012      <Condition field="State" operator="EQ" value="NC"
           internalID="2"
013  relOperator="OR"></Condition>
014    </Selection>
015    <Results>
016      <Field name="FirstName"/>
017      <Field name="LastName"/>
018      <Field name="State"/>
019    </Results>
020  </QueryAbstraction>
```

Illustratively, the abstract query shown in Table I includes a selection specification (lines 005-014) containing selection criteria and a results specification (lines 015-019). In one embodiment, a selection criterion consists of a field name (for a logical field), a comparison operator (=, >, <, etc) and a value expression (what is the field being compared to). In one embodiment, result specification is a list of abstract fields that are to be returned as a result of query execution. A result specification in the abstract query may consist of a field name and sort criteria.

An illustrative data repository abstraction corresponding to the Data Repository Abstraction 132 shown in FIG. 2 is shown in Table II below. By way of illustration, the Data Repository Abstraction 132 is defined using XML. However, any other language may be used to advantage.

TABLE II

DATA REPOSITORY ABSTRACTION EXAMPLE

```
001  <?xml version="1.0"?>
002  <DataRepository>
003    <Category name="Demographic">
004      <Field queryable="Yes"
             name="FirstName" displayable="Yes">
005        <AccessMethod>
006          <Simple columnName="f_name"
                    tableName="contact"></Simple>
007        </AccessMethod>
008        <Type baseType="char"></Type>
009      </Field>
010      <Field queryable="Yes" name="LastName" displayable="Yes">
011        <AccessMethod>
012          <Simple columnName="l_name"
                    tableName="contact"></Simple>
013        </AccessMethod>
014        <Type baseType="char"></Type>
015      </Field>
016      <Field queryable="Yes" name="State" displayable="Yes">
017        <AccessMethod>
018          <Simple columnName="state"
                    tableName="contact"></Simple>
019        </AccessMethod>
020        <Type baseType="char"></Type>
021      </Field>
022    </Category>
023  </DataRepository>
```

Figure 3:
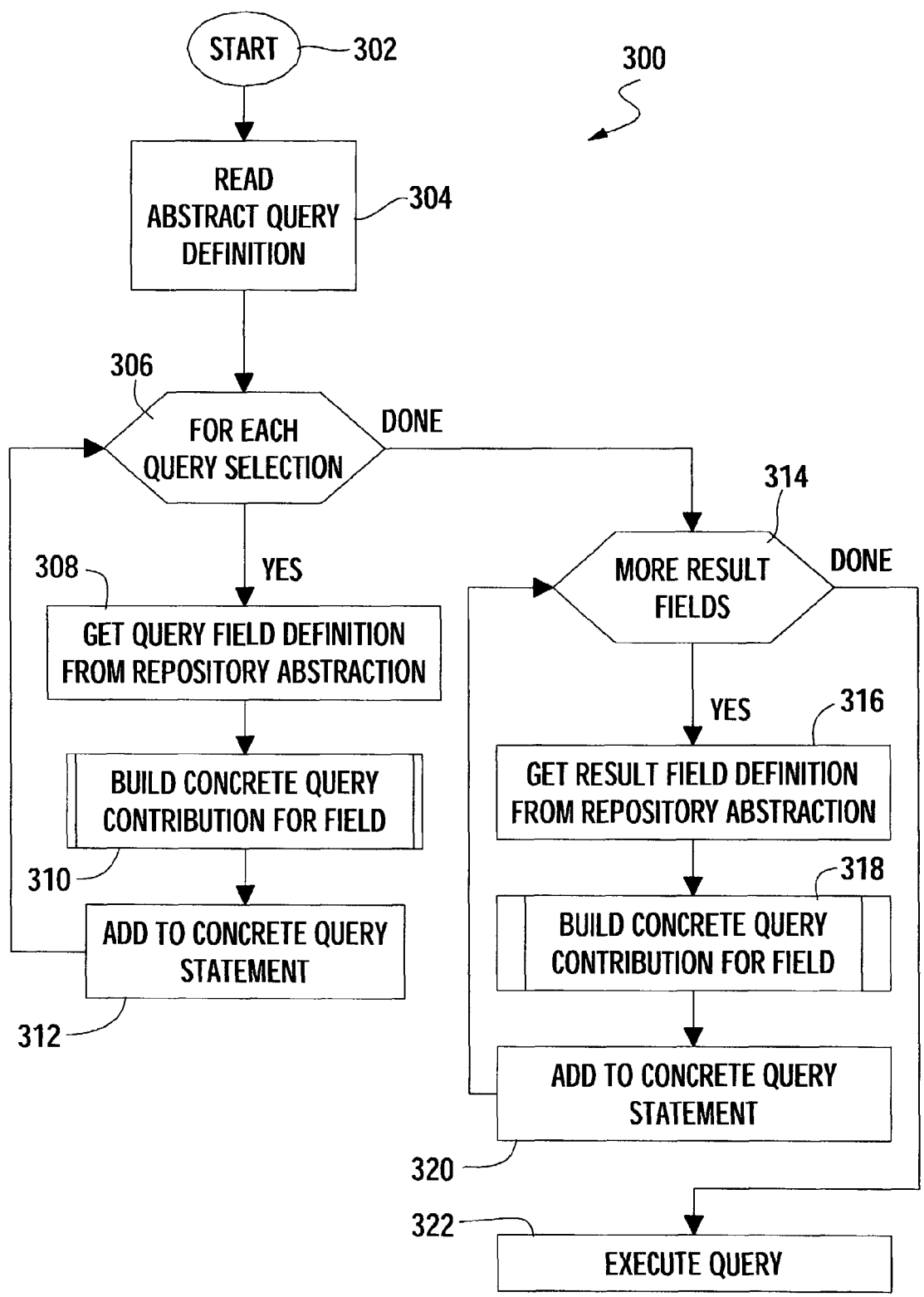
FIG. 3 is a flow chart illustrating the operation of a runtime component.

FIG. 3 shows an illustrative runtime method 300 exemplifying one embodiment of the operation of the runtime component 134. The method 300 is entered at step 302 when the runtime component 134 receives as input an instance of an abstract query (such as the abstract query 202 shown in FIG. 2). At step 304, the runtime component 134 reads and parses the instance of the abstract query and locates individual selection criteria and desired result fields. At step 306, the runtime component 134 enters a loop (comprising steps 306, 308, 310 and 312) for processing each query selection criteria statement present in the abstract query, thereby building a data selection portion of a Concrete Query. In one embodiment, a selection criterion consists of a field name (for a logical field), a comparison operator (=, >, <, etc) and a value expression (what is the field being compared to). At step 308, the runtime component 134 uses the field name from a selection criterion of the abstract query to look up the definition of the field in the data repository abstraction 132. As noted above, the field definition includes a definition of the access method used to access the physical data associated with the field. The runtime component 134 then builds (step 310) a Concrete Query Contribution for the logical field being processed. As defined herein, a Concrete Query Contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 139 shown in FIG. 1. The Concrete Query Contribution generated for the current field is then added to a Concrete Query Statement. The method 300 then returns to step 306 to begin processing for the next field of the abstract query. Accordingly, the process entered at step 306 is iterated for each data selection field in the abstract query, thereby contributing additional content to the eventual query to be performed.

After building the data selection portion of the concrete query, the runtime component 134 identifies the information to be returned as a result of query execution. As described above, in one embodiment, the abstract query defines a list of abstract fields that are to be returned as a result of query execution, referred to herein as a result specification. A result specification in the abstract query may consist of a field name and sort criteria. Accordingly, the method 300 enters a loop at step 314 (defined by steps 314, 316, 318 and 320) to add result field definitions to the concrete query being generated. At step 316, the runtime component 134 looks up a result field name (from the result specification of the abstract query) in the data repository abstraction 132 and then retrieves a Result Field Definition from the data repository abstraction 132 to identify the physical location of data to be returned for the current logical result field. The runtime component 134 then builds (as step 318) a Concrete Query Contribution (of the concrete query that identifies physical location of data to be returned) for the logical result field. At step 320, Concrete Query Contribution is then added to the Concrete Query Statement. Once each of the result specifications in the abstract query has been processed, the query is executed at step 322.

Figure 4:
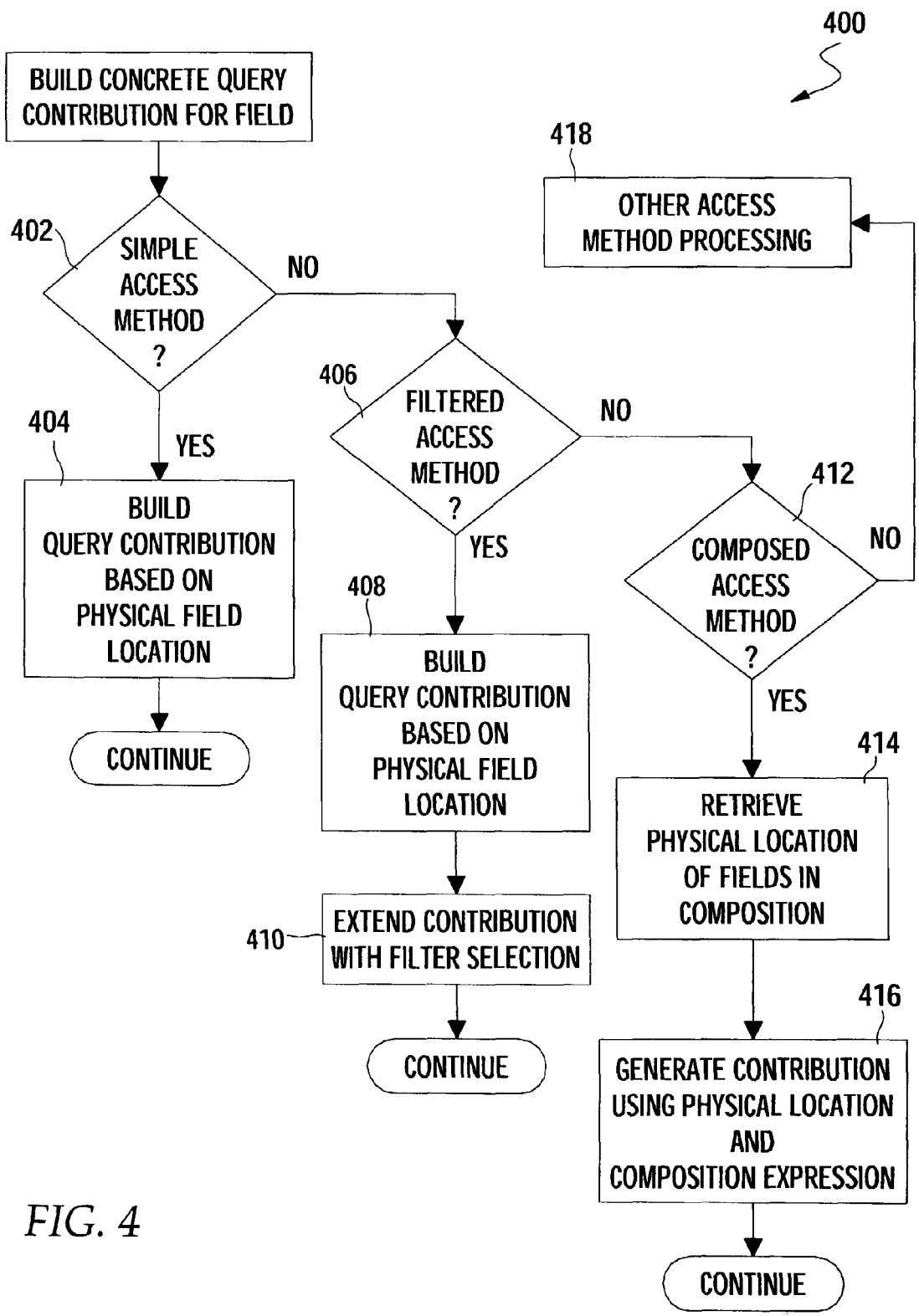
FIG. 4 is a flow chart illustrating the operation of a runtime component.

One embodiment of a method 400 for building a Concrete Query Contribution for a logical field according to steps 310 and 318 is described with reference to FIG. 4. At step 402, the method 400 queries whether the access method associated with the current logical field is a simple access method. If so, the Concrete Query Contribution is built (step 404) based on physical data location information and processing then continues according to method 300 described above. Otherwise, processing continues to step 406 to query whether the access method associated with the current logical field is a filtered access method. If so, the Concrete Query Contribution is built (step 408) based on physical data location information for some physical data entity. At step 410, the Concrete Query Contribution is extended with additional logic (filter selection) used to subset data associated with the physical data entity. Processing then continues according to method 300 described above.

If the access method is not a filtered access method, processing proceeds from step 406 to step 412 where the method 400 queries whether the access method is a composed access method. If the access method is a composed access method, the physical data location for each sub-field reference in the composed field expression is located and retrieved at step 414. At step 416, the physical field location information of the composed field expression is substituted for the logical field references of the composed field expression, whereby the Concrete Query Contribution is generated. Processing then continues according to method 300 described above.

If the access method is not a composed access method, processing proceeds from step 412 to step 418. Step 418 is representative of any other access methods types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

As described above, it may be necessary to perform a data conversion if a logical field specifies a data format different from the underlying physical data. In one embodiment, an initial conversion is performed for each respective access method when building a Concrete Query Contribution for a logical field according to the method 400. For example, the conversion may be performed as part of, or immediately following, the steps 404, 408 and 416. A subsequent conversion from the format of the physical data to the format of the logical field is performed after the query is executed at step 322. Of course, if the format of the logical field definition is the same as the underlying physical data, no conversion is necessary.

In various embodiments, the invention provides numerous advantages over the prior art. In one aspect, advantages are achieved by defining a loose coupling between the application query specification and the underlying data representation. Rather than encoding an application with specific table, column and relationship information, as is the case where SQL is used, the application defines data query requirements in a more abstract fashion that are then bound to a particular physical data representation at runtime. The loose query-data coupling of the present invention enables requesting entities (e.g., applications) to function even if the underlying data representation is modified or if the requesting entity is to be used with a completely new physical data representation than that used when the requesting entity was developed. In the case with a given physical data representation is modified or restructured, the corresponding data repository abstraction is updated to reflect changes made to the underlying physical data model. The same set of logical fields are available for use by queries, and have merely been bound to different entities or locations in physical data model. As a result, requesting entities written to the abstract query interface continue to function unchanged, even though the corresponding physical data model has undergone significant change. In the event a requesting entity is to be used with a completely new physical data representation than that used when the requesting entity was developed, the new physical data model may be implemented using the same technology (e.g., relational database) but following a different strategy for naming and organizing information (e.g., a different schema). The new schema will contain information that may be mapped to the set of logical fields required by the application using simple, filtered and composed field access method techniques. Alternatively, the new physical representation may use an alternate technology for representing similar information (e.g., use of an XML based data repository versus a relational database system). In either case, existing requesting entities written to use the abstract query interface can easily migrate to use the new physical data representation with the provision of an alternate data repository abstraction which maps fields referenced in the query with the location and physical representation in the new physical data model.

In another aspect, the invention facilitates ease-of-use for the application builder and the end-user. Use of an abstraction layer to represent logical fields in an underlying data repository enables an application developer to focus on key application data requirements without concern for the details of the underlying data representation. As a result, higher productivity and reduced error rates are achieved during application development. With regard to the end user, the data repository abstraction provides a data filtering mechanism, exposing pertinent data and hiding nonessential content that is not needed by a particular class end-user developing the given query.

An Exemplary Query Building Graphical User Interface

According to some aspects of the present invention, a graphical user interface (GUI) may provide the end user a convenient means for building a query. The GUI may allow the end user to build complex queries while hiding the underlying details of database operations. Thus, the GUI may allow an end user to concentrate more on building queries to return desired data and less on detailed rules of a query language. The GUI may accomplish this by providing an end user one or more screens for adding query conditions. The GUI may also provide a convenient means for associating query conditions with reusable query components, which may further facilitate building queries through the reuse of common query conditions.

FIGS. 5A-F illustrate exemplary screens of a GUI for building a database query. Of course, the GUI screens of FIGS. 5A-F illustrate only one embodiment of the present invention, and many different variations of suitable GUI screens may allow a user to build a query within the scope of the present invention. For illustrative purposes only, the FIGS. 5A-G will be described with reference to building queries to a database containing fields related to the medical industry. Specifically, the FIGS. 5A-G will be described with reference to an example for building a query for generating a list of patients between the ages of 40 and 50 with heart conditions. Of course, similar GUI screens may be created for building queries to databases containing fields related to any industry.

FIG. 5A illustrates a main search GUI screen 500 of the query building GUI. The main search screen may include a QUERY CONDITIONS window 502 to display a list of current query conditions. The current query conditions may be shown as abstract query conditions in common language terms. As illustrated, the query being built currently has previously added age-related query conditions for "Age>40" and "Age>50." For some embodiments, logical operators relating the current query conditions (e.g., AND, OR, AND NOT, etc.) may be modified directly from the QUERY CONDITIONS window 502, for example, via a pull down menu. Alternatively, logical operators may be specified when adding a new query condition. The current (age related) query conditions may have been added via another GUI screen for adding query conditions to the query, which may be accessed via an ADD CONDITION button 504.

For example, FIG. 5B illustrates a GUI screen 530 for adding query conditions to the query. As illustrated, the GUI screen 530 may present a list of categories to the end user. The list of categories may depend on an industry for which the database is established. For example, for a medical industry database application, the list of categories may include a DEMOGRAPHIC category 532, a LABARATORY RESULT category 534, a REPORTS category 536, and a DIAGNOSTIC CODE category 538 (as illustrated, the DIAGNOSTIC CODE category 538 may allow a user to enter government mandated ICD-9 diagnostic codes). Each of the categories may have a list of related subcategories.

For example, the DEMOGRAPHIC category 532 may include subcategories for Birth and Age Related data, Name, and Address. To enter a query condition related to one of the fields, the end user may select one of the subcategories. In response to selecting one of the subcategories, the user may be presented with another GUI screen allowing for specifying the query condition. For example, one such GUI screen may allow the user to enter the age related conditions listed in FIG. 5A by entering the number of years. Age is typically not stored in a database, but rather calculated from a birth date and current date. However, the GUI may hide this detail from a user, greatly facilitating the entry of age related conditions.

Reusable Query Components

As previously described, multiple queries may share common query conditions. Therefore, embodiments of the present invention allow one or more query condition to be associated with a reusable query component. When building a new query, a reusable query component may be added as a convenient way to add all the associated query conditions to the new query. The number of query conditions associated with a reusable query component may range from one to many. Accordingly, relatively complex queries having a large number of query conditions may be built by adding a relatively small number of reusable query conditions.

As an example of common query conditions, multiple queries issued against a medical database may include query conditions to limit the results to patients with heart conditions. Therefore, a reusable query component may contain query conditions for ICD-9 diagnostic codes associated with heart conditions. For illustrative purposes, the diagnostic codes associated with heart conditions are assumed to be codes 410 and 412. However, the actual diagnostic codes associated with heart disease may be different and may be updated periodically.

To generate the reusable query component for heart condition diagnostic codes, a user may first add query conditions for the individual codes (e.g, via the GUI screen of FIG. 5B), as if building a new query. FIG. 5C, illustrates a main search screen listing the individual query conditions "ICD-9=410" OR "ICD-9=412." An abstract query using these current query conditions may be represented in XML as:

TABLE III

ABSTRACT QUERY EXAMPLE

| | |
|---|---|
| 001 | <?xml version="1.0"?> |
| 002 | <!--Query string representation: (ICD-9 = "410" OR ICD-9 = |
| 003 | "412")--> |
| 004 | <QueryAbstraction> |
| 005 |   <Selection> |
| 006 |     <Condition field="ICD-9" operator="EQ" value="410" > |
| 007 |       <Condition relOperator = "OR" field="ICD-9" operator="EQ" value="412" > |
| 008 |     </Condition> |
| 009 |   </Selection> |
| 010 |   <Results> |
| 011 |     <Field name="ICD-9"/> |
| 012 |   </Results> |
| 013 | </QueryAbstraction> |

Where, the abstract query shown in Table III includes a selection specification (lines 005-009) containing selection criteria (i.e., the age related search conditions) and a results specification (lines 010-012). As illustrated, the relatively simple query in abstract terms ("ICD-9=410" OR "ICD-9=412") may result in a relatively complex abstract code. Therefore, adding these query conditions to a query may not be trivial.

However, according to aspects of the present invention, the user may be able to save the current query conditions as a reusable query component. For example, the user may access another GUI screen, such the GUI screen illustrated in FIG. 5D, for saving the current query conditions as a reusable query component via a SAVE AS COMPONENT button 520. As illustrated, the GUI screen of FIG. 5D may include a NAME edit box 550 allowing a user to enter a name for the reusable query component. For example, the reusable query component may be given a common language descriptive name (e.g., "Heart Conditions") making it possible to identify them without analyzing the actual query conditions contained therein. Further, a DESCRIPTION edit box 554 may allow the user to enter further identifying details. The query conditions, name, and description for each reusable query component may be stored in a database for later retrieval and use.

As illustrated, the user may also be able to specify whether the reusable query component is made available to other users (i.e., public), for example, via a MAKE PUBLIC checkbox 556. Thus, making the reusable query component public may result in even greater reuse of common query conditions. Alternatively, for security reasons, a user may choose not to make a reusable query component public. Further, for some embodiments, different levels of access may be assigned to a reusable query component, allowing only certain users (e.g., with certain privilege levels) access the reusable query component.

When the reusable query component is saved only the query conditions, rather than the entire query may be saved. In other words, as illustrated in TABLE IV, the conditions from the SELECTION section only from the abstract query illustrated in TABLE III may be saved:

TABLE IV

REUSABLE QUERY COMPONENT EXAMPLE

| | |
|---|---|
| 001 | <Condition field="ICD-9" operator="EQ" value="410" > |
| 002 |   <Condition relOperator = "OR" field="ICD-9" operator="EQ" value="412" > |
| 003 | </Condition> |

By saving only the query conditions, reusable query components may be more storage efficient than scripts that store an entire query. As previously described, while the illustrated example may have only two conditions, other reusable query components may be generated with many more conditions. Accordingly, reusable query components may greatly facilitate building complex queries with multiple conditions. Once saved, the conditions of the reusable query component may be added to a query by adding the component.

For example, referring back to FIG. 5A, to add the heart conditions query conditions ("ICD-9=410" OR "ICD-9=412") to the age query conditions ("AGE>40" AND "AGE<50"), the user may add the reusable query component for heart conditions. To add the reusable query component for heart conditions, the user may access another GUI screen, such as the GUI screen 560 illustrated in FIG. 5E, via an ADD COMPONENTS button 506. As illustrated, the GUI screen 560 may display a list of available reusable query components by name, along with associated descriptions. For example, the GUI screen 560 illustrates another reusable query component ("CNS Diseases") that includes query conditions for diagnostic codes for central nervous (CNS) diseases. As illustrated, the GUI screen 560 may allow the user to add, copy, delete, or edit the listed reusable query components. To add the reusable query component for heart conditions, the user may simply press the corresponding ADD button. As a number of reusable query components grows, the GUI screen 560 may also include means for searching the reusable query components (e.g., via names, key words in the descriptions, or even key words in the associated conditions).

FIG. 5F illustrates the final query (for searching patients between the ages of 40 and 50 that have been diagnosed with heart disease) after adding the reusable query component for heart conditions. As illustrated, the individual query conditions listed in the QUERY CONDITIONS window 502 may include the query conditions associated with the HEART CONDITIONS reusable query component. The reusable query component name may also be listed adjacent the individual query conditions to indicate their association with a reusable query component. Thus, reusable query components provide a convenient means for adding one or more query conditions to a query, without having to redefine individual query conditions, or search and edit query scripts. As will be described in greater detail below, in some instances, rather than storing the individual query conditions of a reusable query component with a query, a reference, or link to the reusable query component may be stored, allowing for changes in the underlying conditions to be reflected in the final query at run time.

The GUI screen 500 may also allow a user to change data or format of the output results from the query, via buttons 512 and 514. From the buttons 512 and 514, the user may access other GUI screens that allow the user to choose what data is returned and format an output display list. For example, the user may specify that results displayed sorted on a specified column (e.g., in ascending or descending order). Within an organization, it may be common (or required) to present results in a specified format. For example, in a healthcare organization, results may be listed by patient last name (or date of treatment, age, etc.) in ascending or descending order. In other words, query conditions affecting the output of the results may also be commonly reused for multiple queries. Accordingly, reusable query components may also include formatting conditions which may provide a convenient mechanism for setting the display output for a query.

The GUI screen 500 may also allow a user to view a representation of the query according to a particular data representation. For example, the user may view a screen displaying the query in SQL format by pressing a SHOW SQL button 522, which may cause a runtime component of an application to build a valid SQL query to issue against a database. For other embodiments, a similar function may display the query as an abstract query, for example, in XML. The GUI screen may also include a RUN button 516 allowing a user to build a query based on the list of current conditions and reusable query components, and execute the query against a database.

Figure 6:
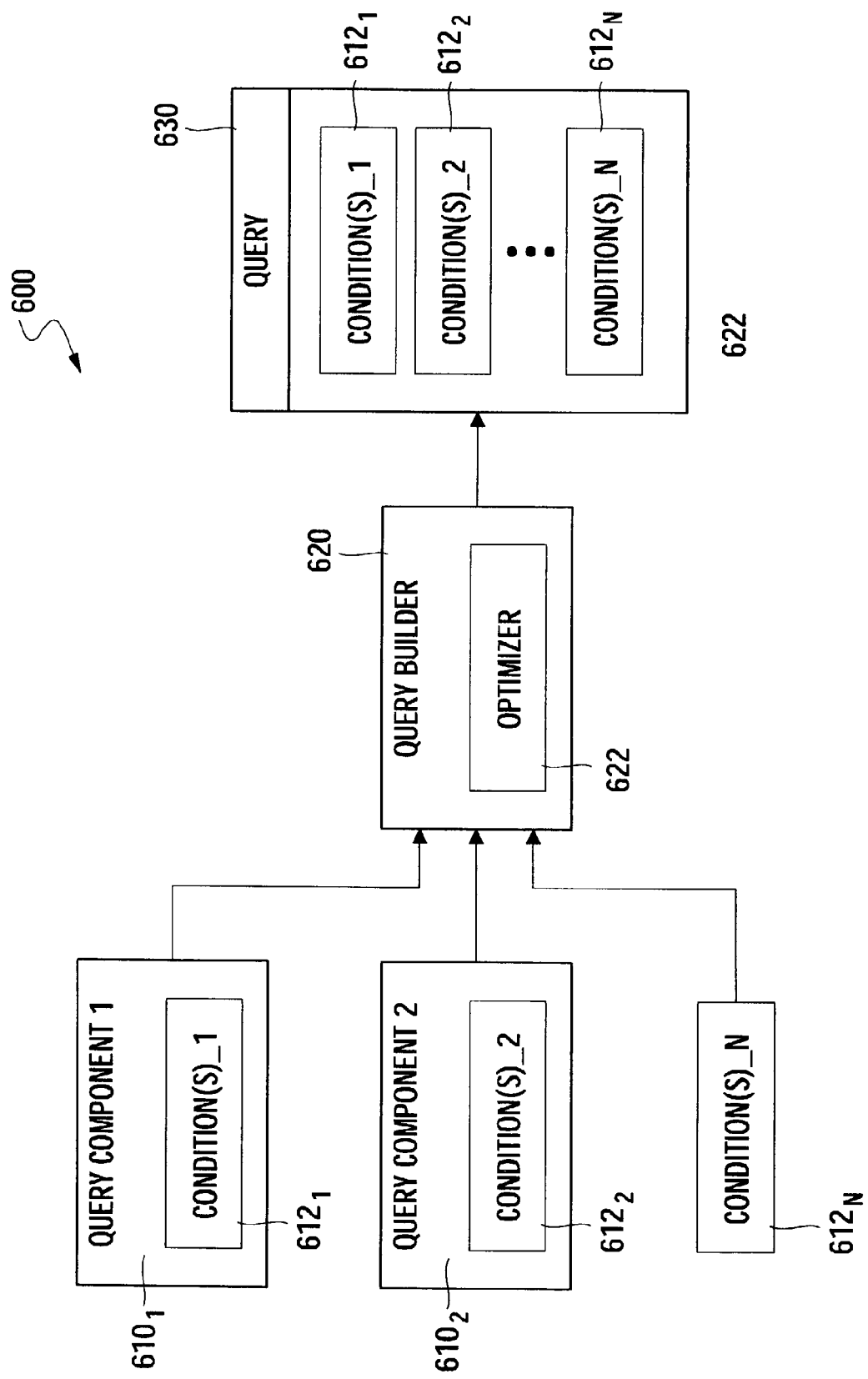
FIG. 6 is a relational view of a query and reusable query components used to build the database query.

FIG. 6 is a relational view of software components of one embodiment of the invention that may be used to build a query from the list of reusable query components and conditions. As illustrated, a query builder 620 may build a query 630 from a conditions $612_1$ and $612_2$ from reusable query components $610_1$ and $610_2$, respectively, and conditions $612_N$, which may or may not be associated with a reusable query component. (Reusable query components $610_1$ and $610_2$ and conditions $612_1$, $612_2$, and $612_N$ may be collectively referred to as components 610 and conditions 612, respectively.) For different queries, the number of components 610 may vary and may include all the conditions 612 for the query 630 (i.e., there may be no independent conditions $612_N$). The query builder 620 may perform any suitable algorithms for building the query 630 from the components 610 and conditions $612_N$. Further, the query builder 620 may include an optimizer 622, for example, to perform optimizations, such as deleting redundant conditions from the conditions 612. For some embodiments, the query builder 620 may be configured to build queries of a particular underlying data representation (e.g., XML, SQL, etc.).

Figure 7:
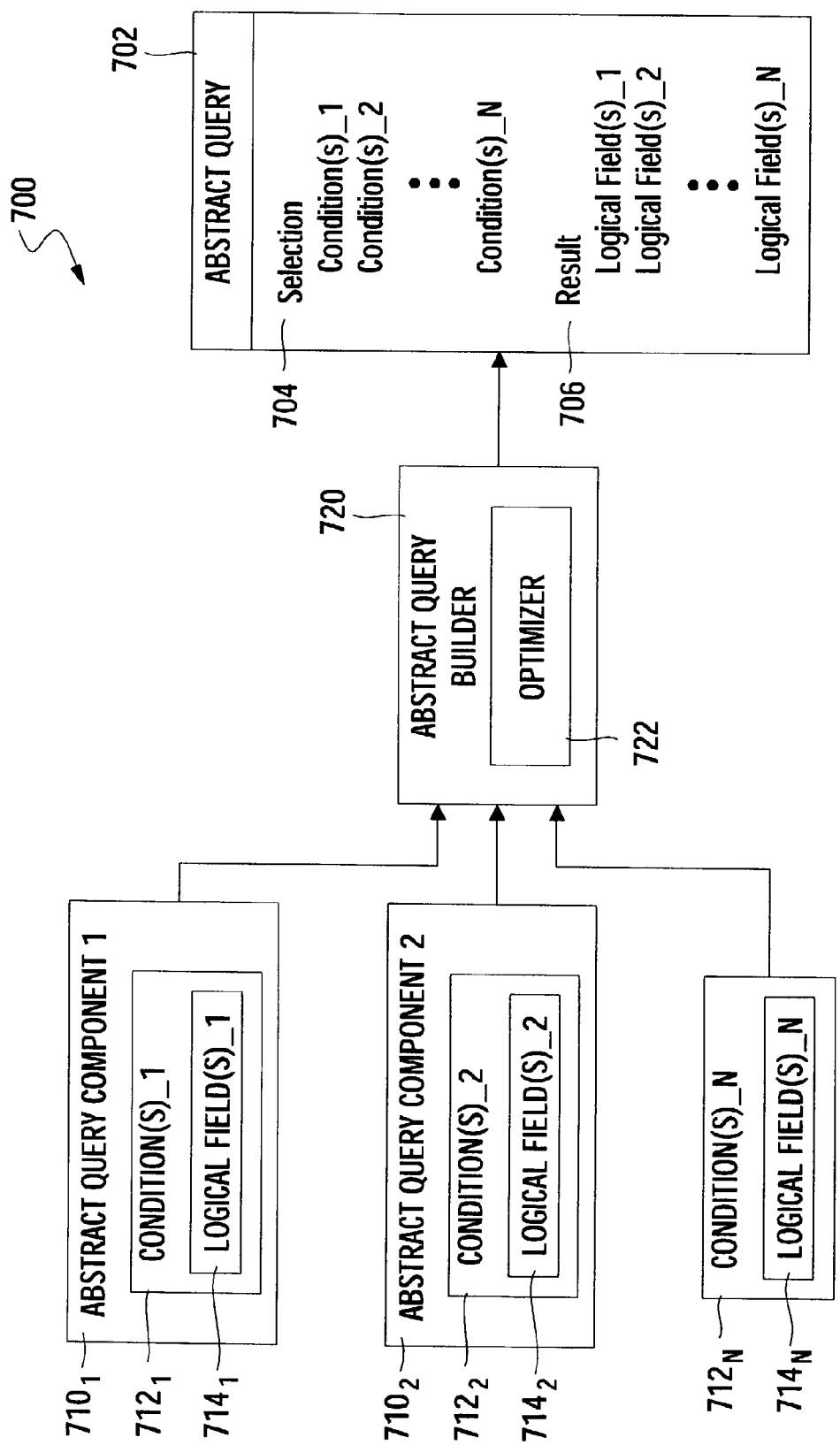
FIG. 7 is a relational view of an abstract query and reusable abstract query components used to build the abstract query.

Alternatively, as illustrated in FIG. 7, an abstract query builder 720 may be configured to build an abstract query 702 from abstract conditions $712_1$ and $712_2$ associated with reusable abstract query components $710_1$ and $710_2$, as well as abstract conditions $712_N$. As illustrated, the abstract conditions $712_1$, $712_2$, and $712_N$ may include logical fields $714_1$, $714_2$, and $714_N$, respectively. As previously described with reference to the abstract query 202 of FIG. 2B, the abstract query 702 is generally referred to herein as an "abstract query" because the query is composed according to abstract logical fields 714, rather than by direct reference to underlying physical data entities in a database. As illustrated, the abstract query 702 may include both criteria used for data selection 704 and an explicit specification of the fields to be returned 706 based on the selection criteria 704. For some embodiments, the abstract query builder 720 may be a software component of the application 120 illustrated in FIG. 2A.

Linked Query Components

According to some aspects of the present invention, reusable query components may be generated from one or more other reusable query components (i.e., the other reusable query components may be referred to as subcomponents with respect to the generated reusable query component). For example, referring back to FIG. 5F, the list of current query conditions 502 includes individual query conditions ("AGE>40" AND "AGE<50"), as well as query conditions associated with a reusable query component (HEART CONDITIONS). These current query conditions could be saved as a component, resulting in a reusable query component with the HEART CONDITIONS component as a subcomponent.

This new reusable query component may be generated with either a dynamic link to the subcomponent HEART CONDITIONS or by directly adding the conditions of the subcomponent HEART CONDITIONS to the new component when generating the new reusable query component. If the new component is generated with a dynamic link to the subcomponents, the query conditions of the subcomponents will not be directly added to the new reusable query component. Rather, when a query is built using the reusable query component, the query will be built using current conditions of the underlying subcomponent retrieved, via the dynamic link, at runtime.

In other words, if a user wanted to ensure that the new component was updated if there were ever changes to the underlying subcomponent HEART CONDITIONS, a dynamic link may be preferable. For example, conditions of the subcomponent HEART CONDITIONS may be expanded to include new diagnostic codes for heart conditions. A dynamic link to the subcomponent may ensure new queries include these new diagnostic codes. Dynamically linking subcomponents may also facilitate maintenance of reusable query components. For example, if an error exists in a subcomponent, the error only needs to be fixed in the subcomponent to fix the error in components dynamically linked to the subcomponent.

On the other hand, if a user wanted the new reusable query component to represent conditions of a subcomponent at the time of generation, they may choose to add the conditions directly (i.e., a static link). If static links are used, a new component is the complete body of the two subcomponents so that it is not associated with the subcomponent anymore. For different embodiments, whether or not to use dynamic links when generating reusable query components from subcomponents may be specified for each subcomponent.

Figure 8:
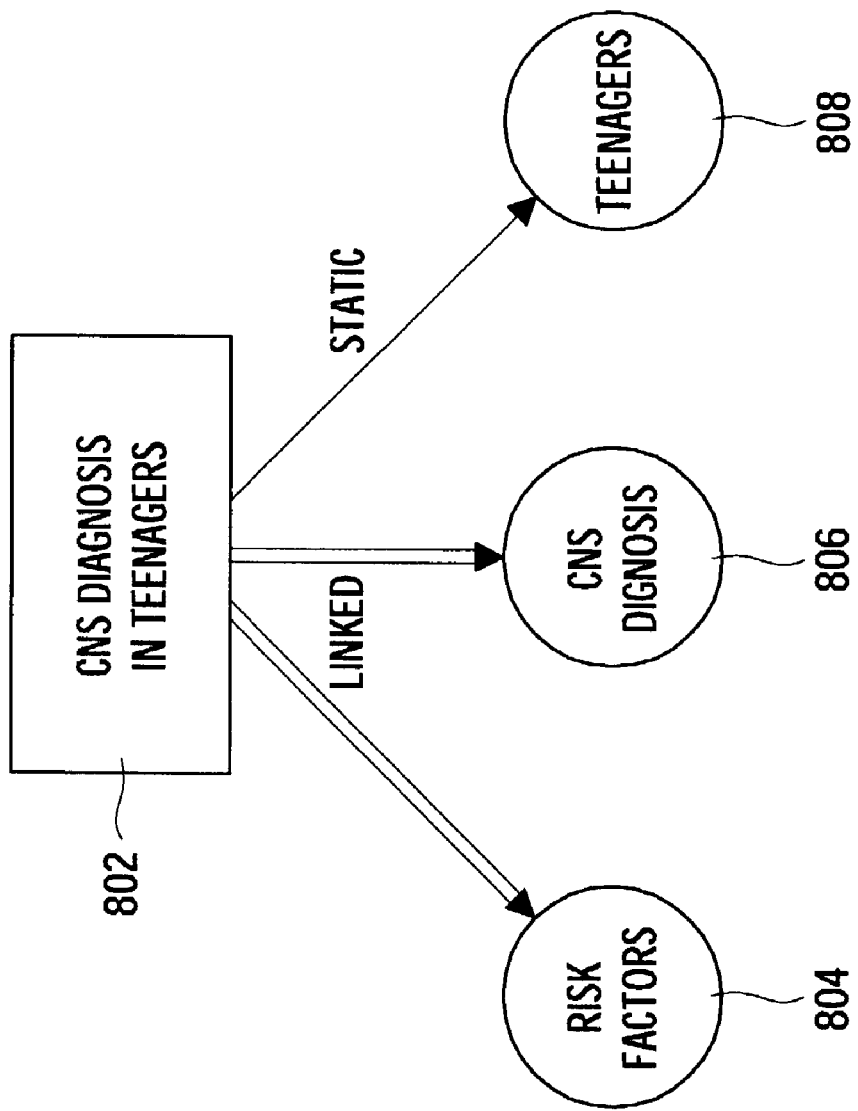
FIG. 8 is a relational view of a reusable query component to linked and unlinked subcomponents.

FIG. 8 illustrates a reusable query component with a combination of dynamic and static links to subcomponents. As illustrated, a reusable query component 802 may be generated to limit query results to teenagers diagnosed with central nervous system (CNS) diseases. Subcomponents 804 and 806 may include query conditions related to risk factors and CNS diagnosis codes, respectively, while subcomponent 808 may include query conditions to limit the query results to teenagers. Because risk factors and CNS diagnosis codes may be updated periodically, the subcomponents 804 and 806 may be dynamically linked to the component 802 (as indicated by the double lines) to ensure that any query built from the component 802 will be executed using search conditions reflecting the latest risk factors and CNS diagnostic codes. On the other hand, the definition of teenagers is not likely to change, so the subcomponent 808 may be statically linked to the component 802 (as indicated by the single line). Therefore, the conditions of the subcomponent 808 may be directly copied into the component 802.

CONCLUSION

Creating reusable query components may facilitate building queries by allowing previously defined query conditions to be reused. Further, reusable query components built for use in a first database system having a first underlying data representation, using conditions with abstract logical fields, may be reused in a second database system having a second underlying data representation. In other words, a data repository abstraction which maps abstract logical fields to specific fields used in the first database system may be modified to map to the same abstract logical fields to specific fields in the second database system. Given the similarity in many businesses, a large number of fields may be similar (e.g., diagnostic fields for businesses in the health care industry, flight departure/arrival times for businesses in the airline industry, etc.). Further, across dissimilar industries, many fields may also be similar, particularly demographic fields (e.g., name, address, birth date, etc.).

It should be noted that any reference herein to particular values, definitions, programming languages and examples is merely for purposes of illustration. Accordingly, the invention is not limited by any particular illustrations and examples. Further, while aspects of the invention are described with reference to SELECTION operations, other input/output operations are contemplated, including well-known operations such as ADD, MODIFY, INSERT, DELETE and the like. Of course, certain access methods may place restrictions on the type of abstract query functions that can be defined using fields that utilize that particular access method. For example, fields involving composed access methods are not viable targets of MODIFY, INSERT and DELETE.

While the foregoing is directed to embodiments of the present invention, other and further embodiments of the invention may be devised without departing from the basic scope thereof, and the scope thereof is determined by the claims that follow.

What is claimed is:

1. A computer implemented method for generating a reusable query component, comprising:
  for each of a plurality of reusable query components:
    (1) specifying, via a graphical user interface (GUI), one or more query conditions to include in the reusable query component, wherein the reusable query component comprises at least the one or more query conditions, wherein each condition provides a portion of a database query in a query language, wherein the condition operates to filter results to be returned by the database query, wherein each query condition is an abstract query condition defined by one or more logical fields and wherein each condition includes:
      a field name referencing a field in a database,
      a comparison operator, and
      a comparison value to which one or more database values for the field are compared, based on the comparison operator, to determine whether the condition is satisfied for a given database value corresponding to the field;
    (ii) specifying, via the GUI, a name to identify the reusable query component;
    (iii) specifying, via the GUI, an access level to assign to the reusable query component, wherein the access level indicates a privilege level required for a user in order for the reusable query component to be made available to the user for use in building in a database query;
    (iv) associating the reusable query component with the specified name and the specified access level;
    (v) storing the reusable query component, the specified access level, and the specified name; wherein the storing comprises storing XML representations of the one or more query conditions, the specified access level, and the specified name in a database for later retrieval; and
  receiving a request to include at least two of the plurality of reusable query components in an abstract query, wherein the request specifies the respective name of the at least two reusable query components; and
  upon determining that the request satisfies the respective specified access level for the reusable query components, including all of the respective query conditions of the reusable query components in the abstract query, responsive to the request.

2. The method of claim 1, further comprising entering a description for the reusable query component via the GUI and storing the description with the name.

3. A computer-readable storage medium containing a program which, when executed by a processor, performs an operation for generating a reusable query component, the operation comprising:

for each of a plurality of reusable query components:
(i) receiving, from a user, one or more query conditions to associate with a reusable query component, wherein each condition provides a portion of a database query in a query language, wherein the condition operates to filter results to be returned by the database query, wherein each are condition is an abstract query condition defined by one or more logical fields and wherein each condition includes:
a field name referencing a field in a database,
a comparison operator, and
a comparison value to which one or more database values for the field are compared, based on the comparison operator, to determine whether the condition is satisfied for a given database value corresponding to the field;
(ii) receiving, from the user, a name for the reusable query component; and
(iii) receiving, from the user, an access level to assign to the reusable query component, wherein the access level indicates a privilege level required for a user in order for the reusable query component to be made available to the user for use in building in a database query, and wherein the access level is specific to the reusable query component;
(iv) associating the one or more query conditions with the specified name and the specified access level; and
(v) storing the one or more query conditions, the specified name, and the specified access level; wherein the storing comprises storing XML representations of the one or more query conditions, the specified access level, and the specified name in a database for later retrieval;

receiving a request to include at least two of the plurality of reusable query component in abstract query, wherein the request specifies the respective name of the at least two reusable query components; and upon determining that the request satisfies the respective specified access level for the reusable query components, including all of the respective query conditions of the reusable query components in the abstract query, responsive to the request.

4. The computer-readable storage medium of claim 3, wherein the operations further comprise providing one or more graphical user interface (GUI) screens for receiving the one or more query conditions and the name from the user.

5. The computer-readable storage medium of claim 3, wherein the operations further comprise providing a graphical user interface (GUI) screen displaying a list of the one or more reusable query components.

6. The computer-readable storage medium of claim 3, wherein providing a graphical user interface (GUI) screen displaying a list of the one or more reusable query components comprises displaying a description for each of the one or more reusable query components.

7. The computer-readable storage medium of claim 3, wherein the operations further comprise mapping the one or more logical fields to physical entities of data in the database.

8. A database system, comprising:
a processor;
a memory storing a plurality of executable components, including at least:
a graphical user interface component configured to receive, from a user:
a plurality of reusable query components for use in building a database query, each reusable query component having one or more associated query conditions to associate with the reusable query component, wherein each condition provides a portion of a database query in a query language, wherein the condition operates to filter results to be returned by the database query, wherein each query condition is an abstract query condition defined by one or more logical fields and wherein each condition includes:
a field name referencing a field in a database,
a comparison operator, and
a comparison value to which one or more database values for the field are compared, based on the comparison operator, to determine whether the condition is satisfied for a given database value corresponding to the field;
wherein each of the reusable query components includes:
a name to identify the reusable query component; and
an access level to assign to the reusable query component, wherein the access level indicates a privilege level required for a user in order for the reusable query component to be made available to the user for use in building in a database query, and wherein the access level is specific to the reusable query component, and wherein XML representations of the one or more query conditions, the specified access level, and the specified name are stored a database for later retrieval; and
a query building component configured to, via operation of the one or more computer processors:
receive a request to include at least two of the plurality of reusable query component in an abstract query, wherein the request specifies the respective name of the at least two reusable query components; and
upon determining that the request satisfies the respective specified access level for the reusable query components, include all of the respective query conditions of the reusable query components in the abstract query, responsive to the request.

9. The database system of claim 8, wherein the executable components further comprise:
a data repository abstraction component comprising mapping rules which map the one or more logical fields to physical entities of data; and
a runtime component for transforming the abstract query into a query consistent with the physical entities of data according to the mapping rules.

* * * * *